US010995544B2

(12) United States Patent
Zitting

(10) Patent No.: US 10,995,544 B2
(45) Date of Patent: May 4, 2021

(54) METHOD AND APPARATUS FOR STACKING STRIP MATERIAL OF CELLULAR BLIND FABRICS

(71) Applicant: Lorin Zitting, Colorado City, AZ (US)

(72) Inventor: Lorin Zitting, Colorado City, AZ (US)

( * ) Notice: Subject to any disclaimer, the term of this patent is extended or adjusted under 35 U.S.C. 154(b) by 275 days.

(21) Appl. No.: 16/105,968

(22) Filed: Aug. 20, 2018

(65) Prior Publication Data

US 2019/0055778 A1 Feb. 21, 2019

Related U.S. Application Data

(60) Provisional application No. 62/547,698, filed on Aug. 18, 2017.

(51) Int. Cl.
*B32B 41/00* (2006.01)
*E06B 9/266* (2006.01)

(52) U.S. Cl.
CPC .................................... *E06B 9/266* (2013.01)

(58) Field of Classification Search
CPC ........................................................ E06B 9/266
USPC .................... 156/60, 64, 350, 351, 378, 379
See application file for complete search history.

(56) References Cited

U.S. PATENT DOCUMENTS

2011/0031308 A1 * 2/2011 Holland-Letz ......... B65H 1/022
235/379

* cited by examiner

*Primary Examiner* — Michael N Orlando
*Assistant Examiner* — Joshel Rivera
(74) *Attorney, Agent, or Firm* — Gurr Brande & Spendlove, PLLC; Robert A. Gurr

(57) ABSTRACT

A stacker assembly for manufacturing an expandable integral blind, formed by adhering a plurality of cells formed from strip material, has opposing walls forming a stacking chamber and a rotating mechanism coupled to the stacking chamber for engaging the expandable integral blind. The rotatable mechanism actuates in response to the compression force of the expandable integral blind. A plurality of conveyor belts are used to supply the strip material to the stacker assembly, as well as introduce the strip material into the stacking chamber.

16 Claims, 12 Drawing Sheets

METHOD AND APPARATUS FOR STACKING STRIP MATERIAL OF CELLULAR BLIND FABRICS

CROSS-REFERENCE TO RELATED APPLICATIONS

This application claims the benefit of U.S. Provisional Application Ser. No. 62/547,698, filed on Aug. 18, 2017, which is incorporated herein by reference.

TECHNICAL FIELD

The present disclosure relates to stacking strip material of cellular blind fabrics. More particularly, a method and apparatus/assembly for conveying strips of material and for adhering the strips one-to-another to form an integral blind is disclosed.

BACKGROUND

Retractable window coverings ("blinds") can be made of cellular structures for control of light and/or insulation. These cellular structures can be a single row of hollow cells or multi-cellular ("honeycomb") configurations and are often produced by bonding together strips of folded or tubular material in stacks, forming an expandable fabric portion of the blind. An example of an apparatus to produce such fabrics by stacking such strips is disclosed in U.S. Pat. No. 5,308,435 to Ruggles et al. The accurate stacking of such strips can be difficult to automate due to the strip materials having various textures, thicknesses, stiffness, folding configurations, and bonding methods. These challenges may lead to irregular blind fabrics which adversely affect the aesthetic quality of the blinds. This presents challenges related to: 1) conveying strip materials into the stacking apparatus with sufficient speed; 2) accurately placing the strip material in alignment with the fabric stack, while actuating and pressing (in the case of some adhesive bonding methods) the strip into contact with the stack; and 3) providing back-pressure of the stack to counteract the force of pressing the strip into the stack and/or hold the strips together while bonding completes—while allowing accumulation and then removal of the stack.

Conveying strip materials into a stacking apparatus has been accomplished by using vacuum belts as disclosed in U.S. Pat. No. 5,664,773 to Sevcik et al. or U.S. Pat. No. 5,308,435 to Ruggles et al., but this presents challenges in releasing the strip in an accurate location. Pinching between rollers entering the stacking apparatus, as disclosed in Publication US20050147800A1 to Herhold et al. (the '800 publication), presents challenges in fully-actuating the strip into accurate placement, as the strip length exits the rollers before being in the complete stack position.

Alignment of the strip material prior to stacking has been attempted by the use of a guide groove and pusher, as in the aforementioned '800 publication or in Publication US20040007310A1 (see FIG. 4) to Hsu. These grooves need sufficient space to accommodate for inconsistencies in the strips and the pusher may not move the strip symmetrically or uniformly along its length. Thus, it is difficult to achieve accurate placement on the stack.

Back-pressure on the stack throughout accumulation has been accomplished by providing a constant force on the stack, such as the weight shown in the aforementioned '435 patent. However, this weight would need to be removed occasionally to access the finished stack and may not provide constant force due to the stack's own weight accumulation.

Another common method to provide back-pressure is by using friction to constrict the stack exiting the stacker, as shown in U.S. Pat. No. 4,849,039 (FIG. 7, 8) to Colson et al. These constrictions may be adjustable or actuated, as shown in U.S. Pat. No. 5,897,730 to Huang. However, friction would accumulate with the stack, and be especially inconsistent for the first few strips of the fabric.

Therefore, there is a need for a stacker that is capable of rapidly positioning the strips for accurate alignment of the stack and that has ideal back-pressure. The present invention seeks to solve these and other problems.

SUMMARY OF EXAMPLE EMBODIMENTS

A stacker assembly for manufacturing an expandable integral blind formed by adhering a plurality of cells formed from strip material, the stacker assembly comprising a first outer conveyor belt and a second outer conveyor belt, each outer conveyor belt configured to engage a top surface of a strip of material being conveyed; a center conveyor belt positioned between the first and second outer conveyor belts, the center conveyor belt configured to engage a bottom surface of the strip of material; the outer conveyor belts and center belt configured to convey the strip of material into a stacking chamber, the stacking chamber formed by two opposing walls; a plurality of clamping tabs below each wall configured to clamp the top edges of the strip of material, the clamping tabs positioned beneath the first and second outer conveyor belts; and a plurality of support fingers configured to support a stack formed from the plurality of strips of material.

A method for manufacturing an expandable integral blind formed by adhering a plurality of cells formed from strip material, the method comprising supplying a plurality of strips of material in succession to a stacker assembly, the strips of material conveyed into a stacking chamber using a first outer conveyor belt and a second outer conveyor belt, each outer conveyor belt configured to engage a top surface of the strip of material being conveyed, and a center conveyor belt positioned between the first and second outer conveyor belts, the center conveyor belt configured to engage a bottom surface of the strip of material; securing the conveyed strip of material in the stacking chamber using a plurality of clamping tabs; retracting the first and second outer conveyor belts from contact with the conveyed strip of material; raising the center conveyor belt and conveyed strip of material while simultaneously withdrawing the clamping tabs so that the conveyed strip of material contacts and adheres to a previously conveyed strip of material, forming a stack; lowering the center conveyor belt and supporting the stack on a plurality of support fingers; and positioning the outer conveyor belts and center conveyor belt to engage a successive strip of material.

A stacker assembly for manufacturing an expandable integral blind formed by adhering a plurality of cells formed from strip material, the stacker assembly comprising opposing walls forming a stacking chamber; and, a rotating mechanism coupled to the stacking chamber for engaging the expandable integral blind; wherein, the rotatable mechanism actuates in response to the compression force of the expandable integral blind.

DETAILED DESCRIPTION OF EXAMPLE EMBODIMENTS

Figure 1:
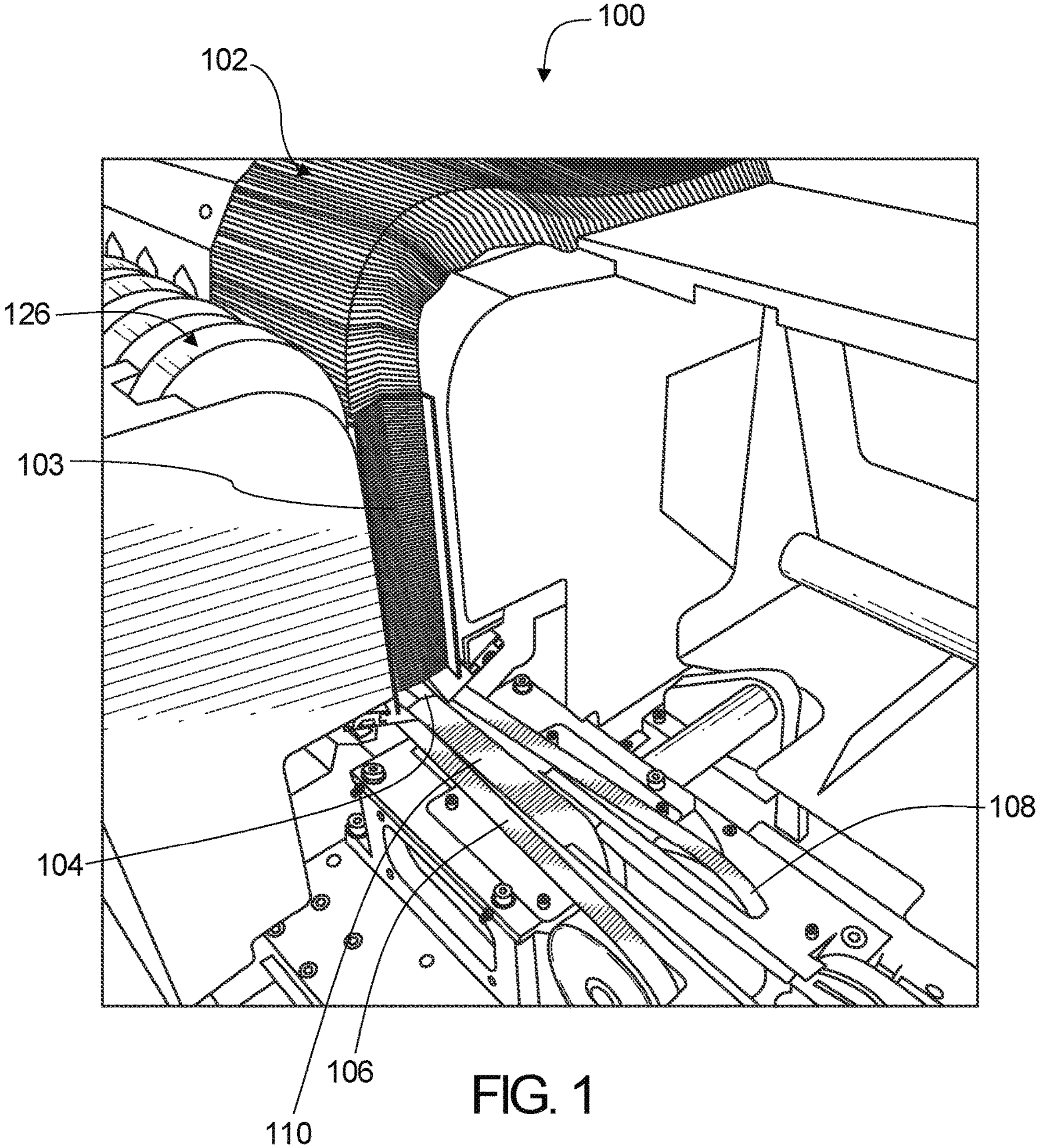
FIG. 1 illustrates a stacker assembly.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a stacker that is capable of rapidly positioning the strips for accurate alignment of the stack and that has ideal back-pressure. The stacker assembly and method of use disclosed herein solves these, and other, problems.

Figure 2:
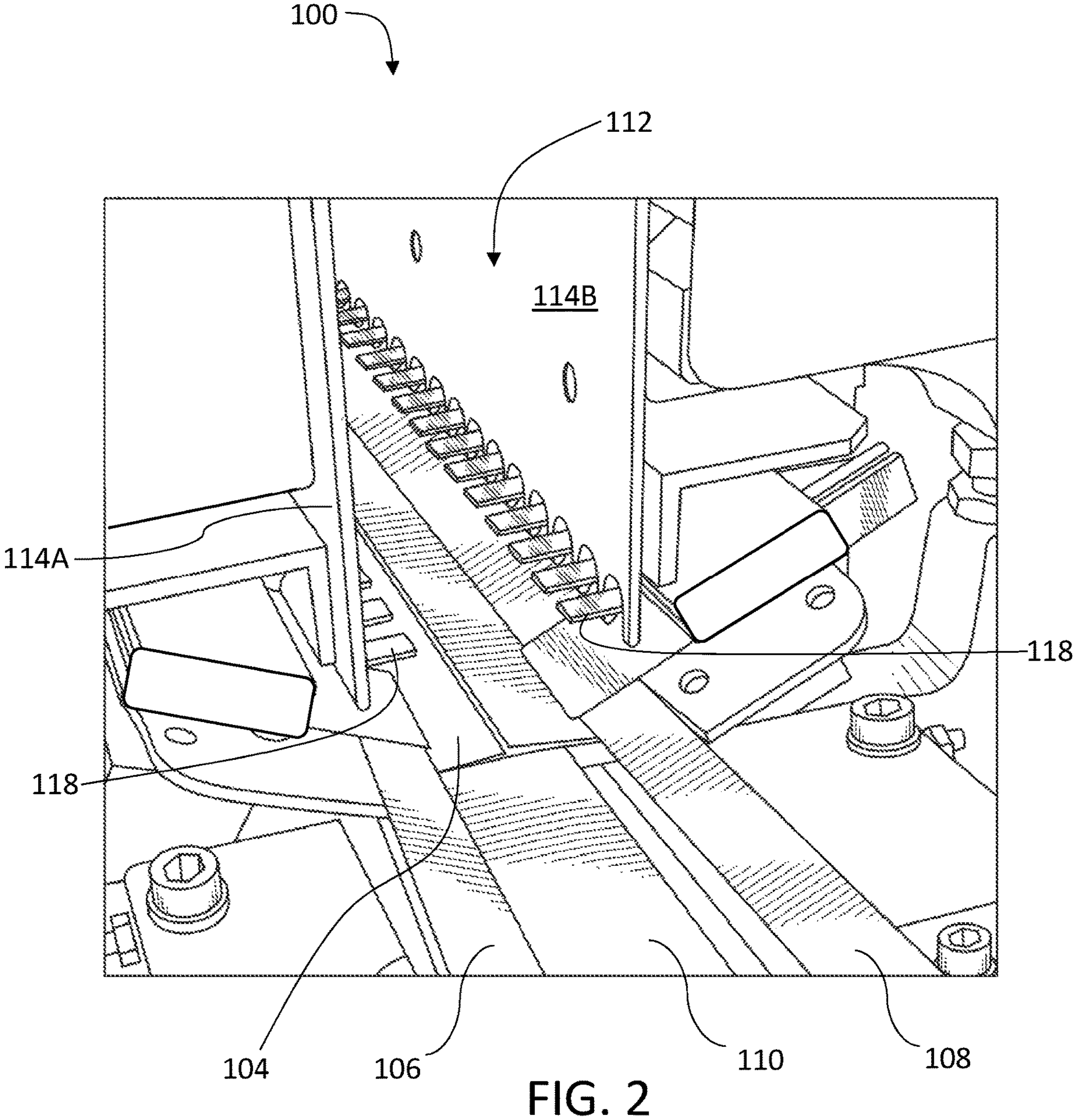
FIG. 2 illustrates a detailed view of a stacker assembly in a first position.

As shown in FIG. 1, a stacker assembly 100 for manufacturing an expandable integral blind 102 is formed by adhering a plurality of cells formed from strip material 104. The strip material may be any suitable material for forming expandable blinds, which is well-known in the art. As shown in FIGS. 1-10, the stacker assembly 100 comprises a first outer conveyor belt 106 and a second outer conveyor belt 108. Each outer conveyor belt 106, 108 is configured to engage a top surface of the strip material 104 being conveyed. A center conveyor belt 110 is positioned between the first and second outer conveyor belts 106, 108, and is configured to engage a bottom surface of the strip material 104. In other words, and as best seen in FIG. 2, the strip material 104 is interposed between the center conveyor belt 110 and the two outer conveyor belts 106, 108. The outer conveyor belts 106, 108 and center belt 110 are configured to convey the strip material 104 into a stacking chamber 112, the stacking chamber 112 formed by two opposing walls 114A, 114B. The two outer conveyor belts 106, 108 function to not only convey the strip material 104 into the stacking chamber 112, but also to keep the strip material 104 appropriately folded. In other words, and as shown in the figures, the strip material 104 is folded to create "flaps," with the outer conveyor belts 106, 108 keeping the flaps down as the strip material 104 is positioned.

Figure 3:
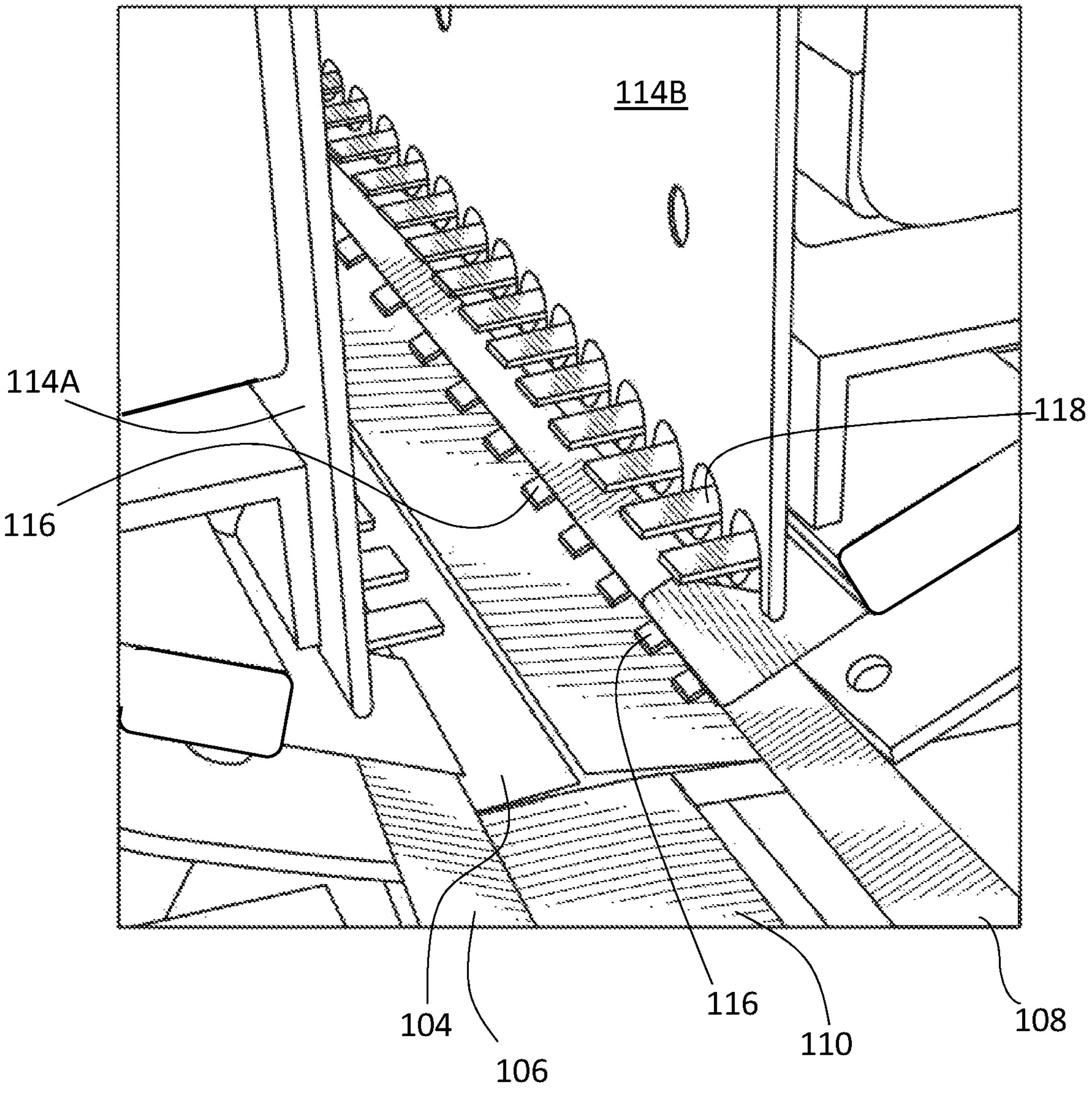
FIG. 3 illustrates a detailed view of a stacker assembly with the outer conveyor belts partially retracted.
Figure 4:
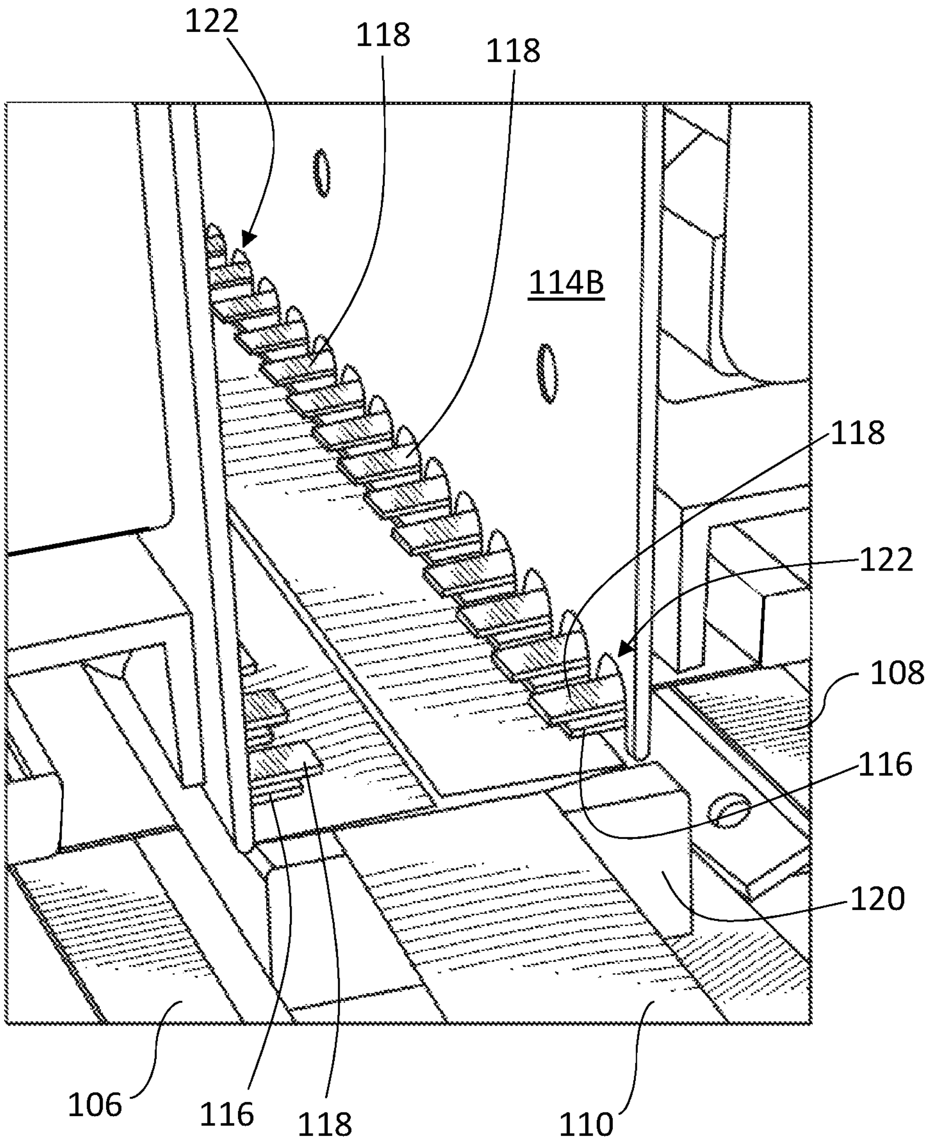
FIG. 4 illustrates a detailed view of a stacker assembly in a second position, with the outer conveyor belts fully-retracted.

As shown in FIG. 3, a plurality of clamping tabs 116 are positioned below each wall 114A, 114B and are configured to clamp the top edges of the strip material 104. As shown, the clamping tabs 116 are positioned beneath the first and second outer conveyor belts 106, 108. In one example, the strip material 104 is conveyed into the stacking chamber 112, at which point the outer conveyor belts 106, 108, and the center conveyor belt 110 all cease moving. Above the strip material 104, but below the outer conveyor belts 106, 108 are positioned the clamping tabs 116. In a first position, as shown in FIG. 2, the clamping tabs 116 are concealed beneath the outer conveyor belts 106, 108. The outer conveyor belts 106, 108 are then retracted (see FIG. 3, where the outer belts 106, 108 are partially retracted), exposing the clamping tabs 116, which engage the top surface of the strip material 104. The clamping tabs 116 prevent the strip material 104 from unfolding and also keep it aligned with the stacking chamber 112. As outer conveyor belts 106, 108 retract, strip material 104 is moved upward by chamber platform 120 (FIG. 4) and center conveyor belt 110 toward the stack 103 above it (also compare FIGS. 6-7). Clamping tabs 116 move upwardly simultaneously until outer conveyor belts 106, 108 are in a fully-retracted position and clamping tabs 116 are abutting a plurality of support fingers 118, as best seen in FIG. 4. The strip material 104 is now aligned and in position to adhere to the stack 103 above it (the stack 103 is not shown in FIG. 3, but see FIGS. 6-7 for an example).

Figure 5:
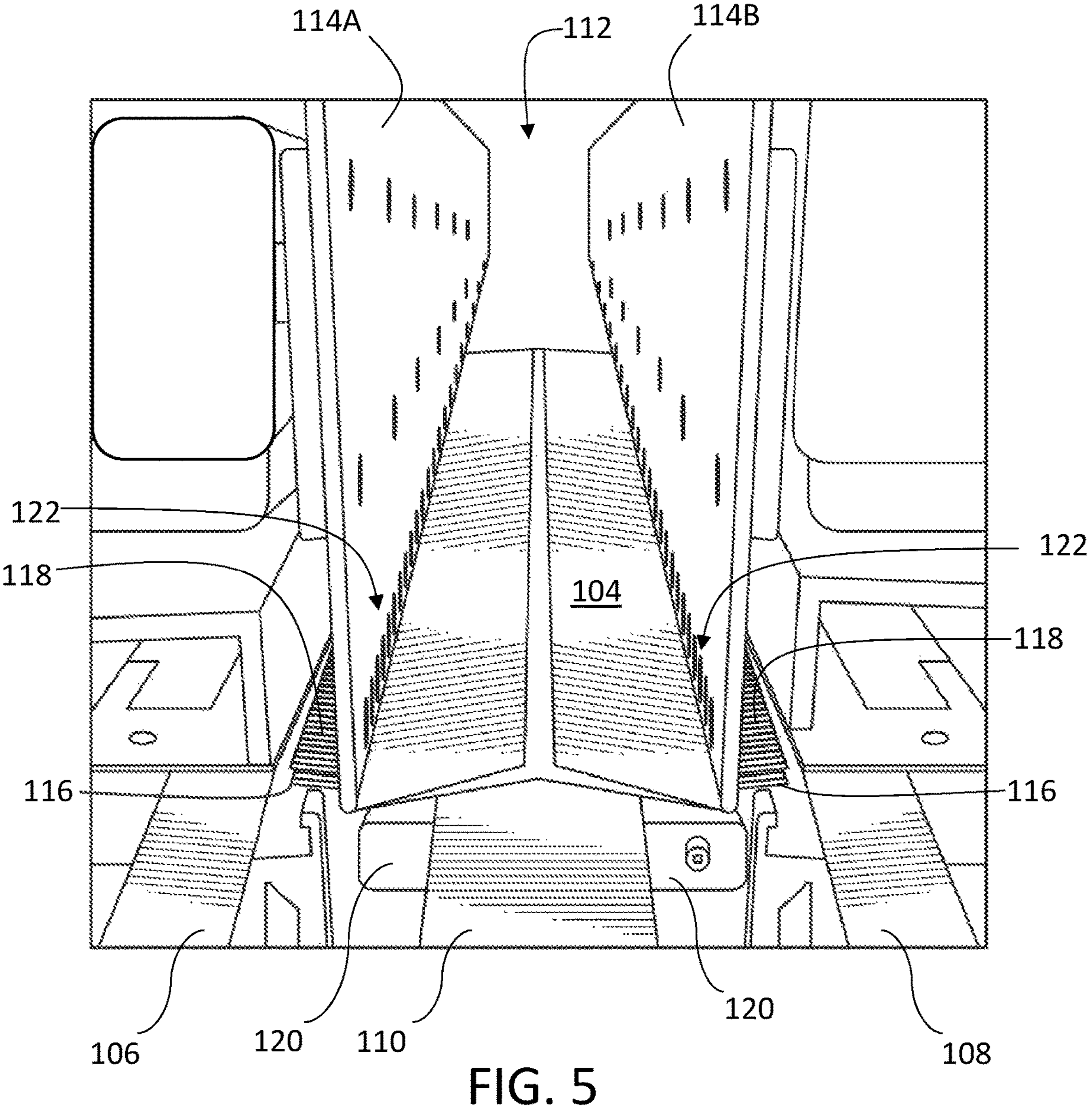
FIG. 5 illustrates a stacker assembly with the support fingers and clamping tabs fully-retracted.
Figure 6:
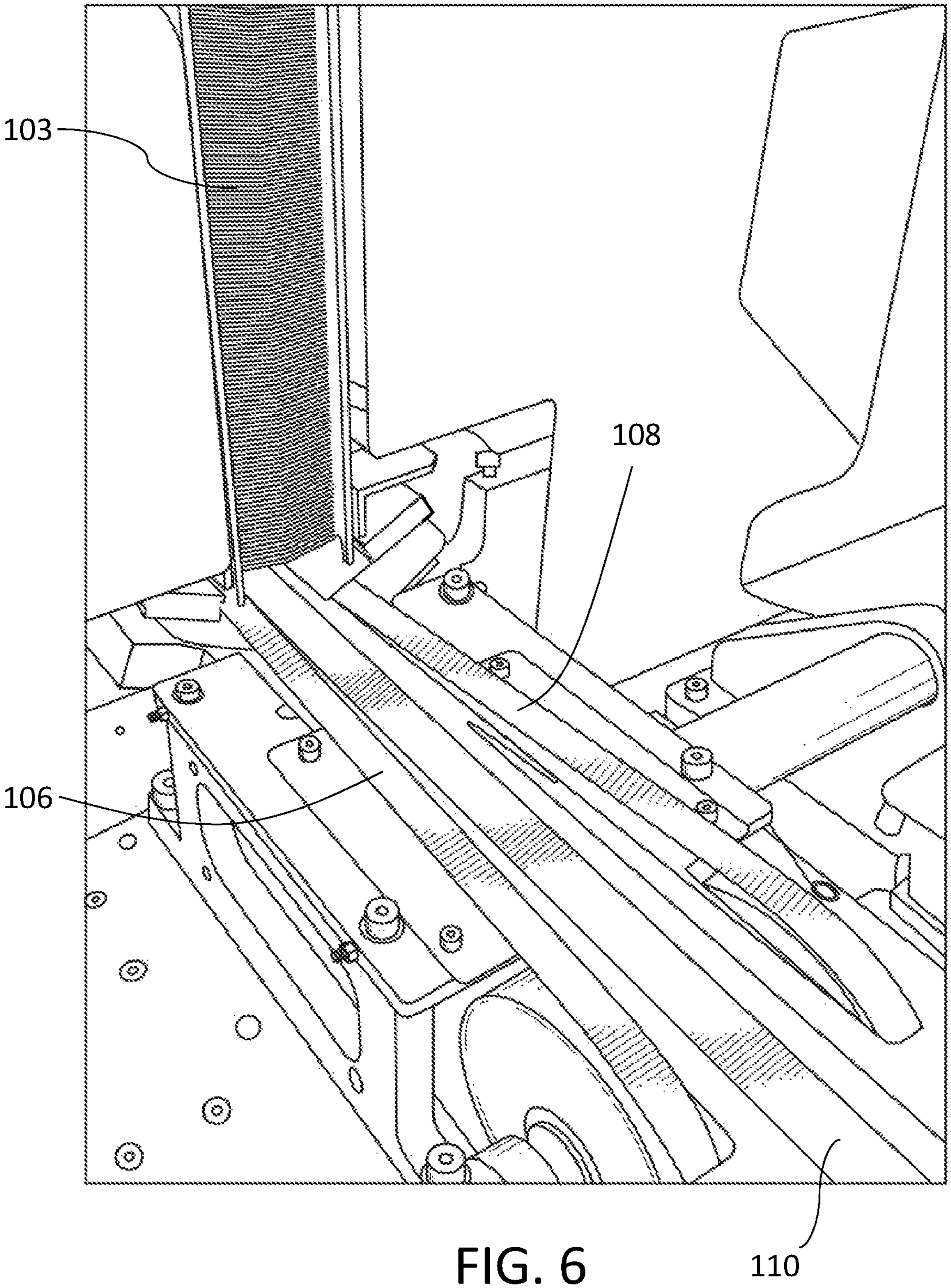
FIG. 6 illustrates a stacker assembly in a first position.
Figure 7:
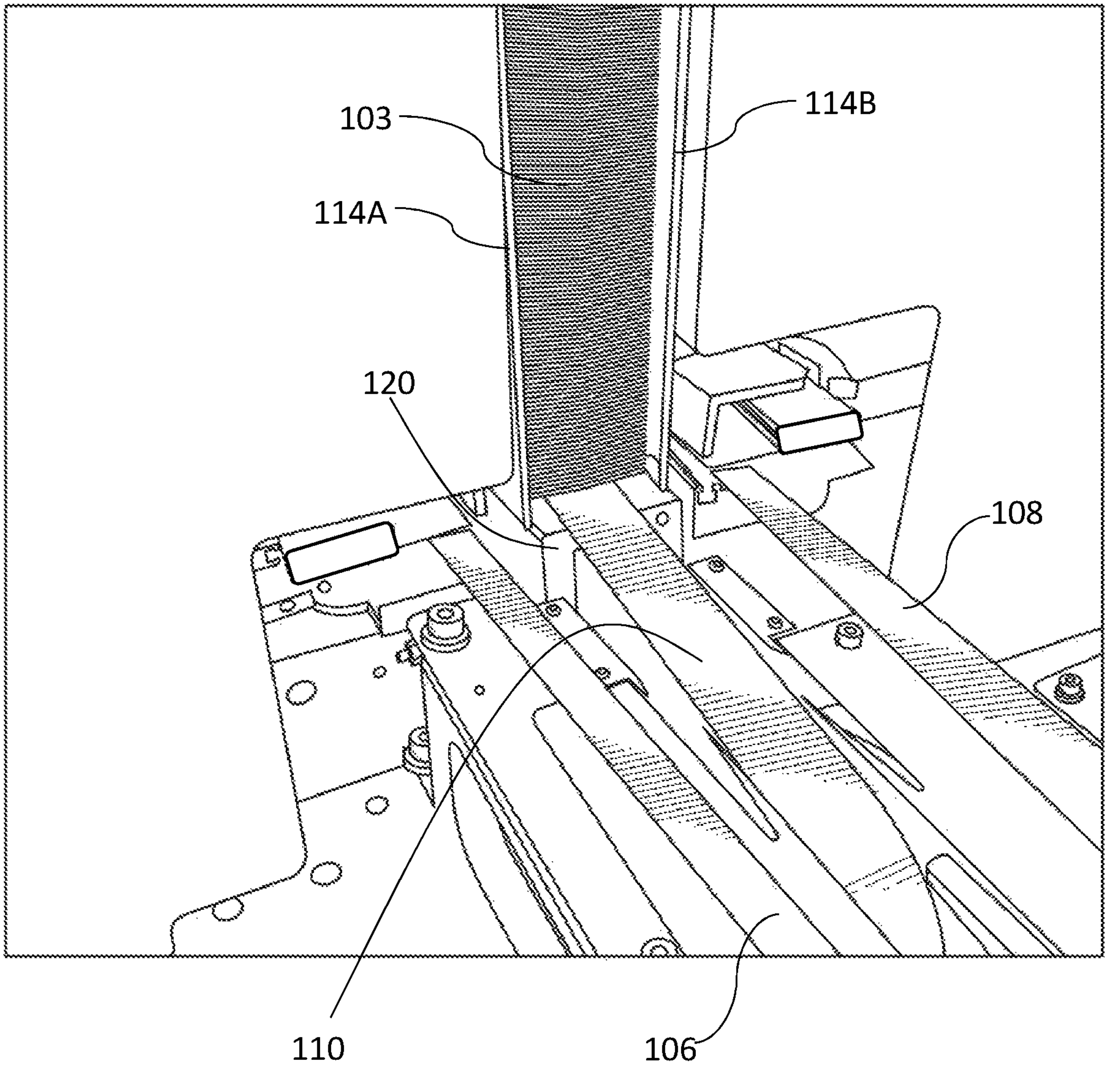
FIG. 7 illustrates a stacker assembly in a second position.

As shown in FIGS. 6-9, once the strip material 104 is aligned with the stack 103, the plurality of clamping tabs 116 and the plurality of support fingers 118 are retracted from within the stacking chamber 112 through wall apertures 122 while the chamber platform 120 and center conveyor belt 110 simultaneously move further upwards, ensuring that the folded strip material 104 and adhesive thereon engages the stack 103 before having a chance to unfold. FIGS. 4-5 show a detailed view of one strip material 104 in this process, while FIGS. 6-7 show the process with a stack 103 of integral blind material 102. In FIG. 6, the chamber platform 120 and center conveyor belt 110 are lowered in a first position. FIG. 7 illustrates a second position, where the chamber platform 120 and center conveyor belt 110 are raised and contact is made with the stack 103.

Figure 8:
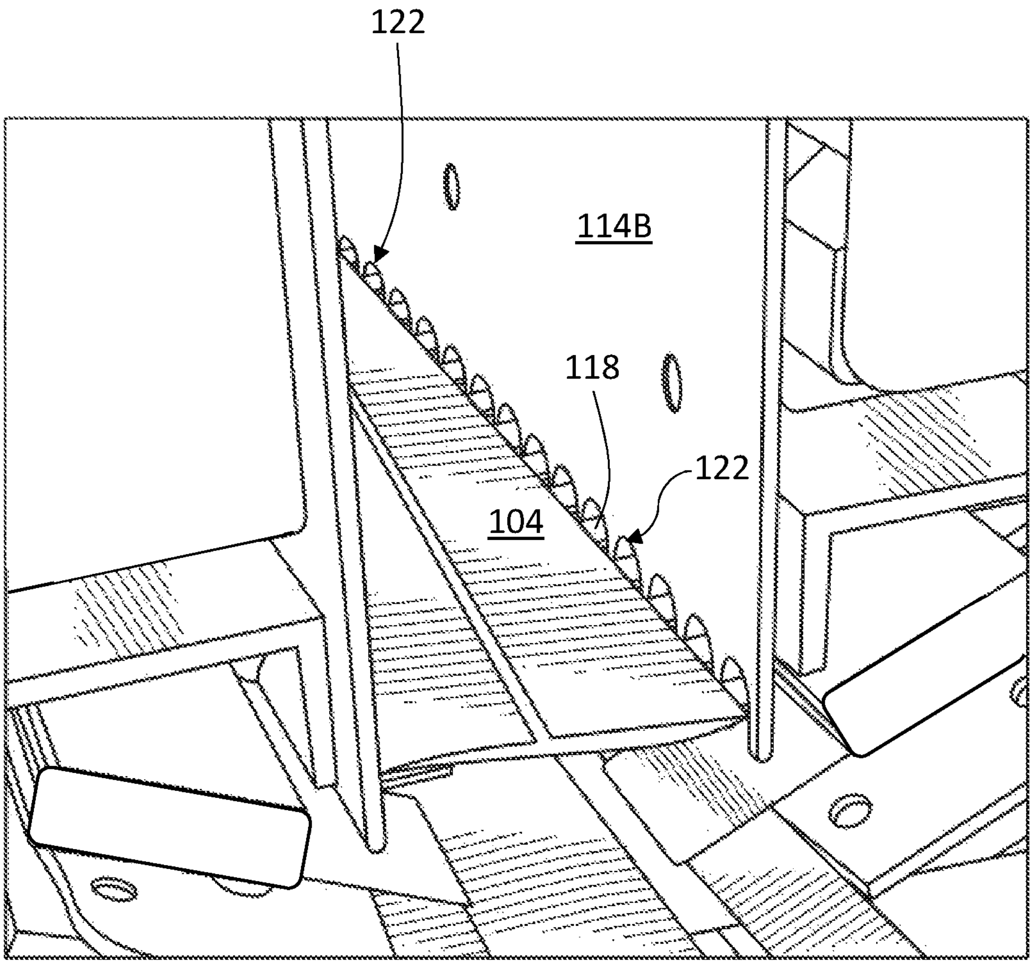
FIG. 8 illustrates a strip of material supported by a plurality of support fingers.
Figure 9:
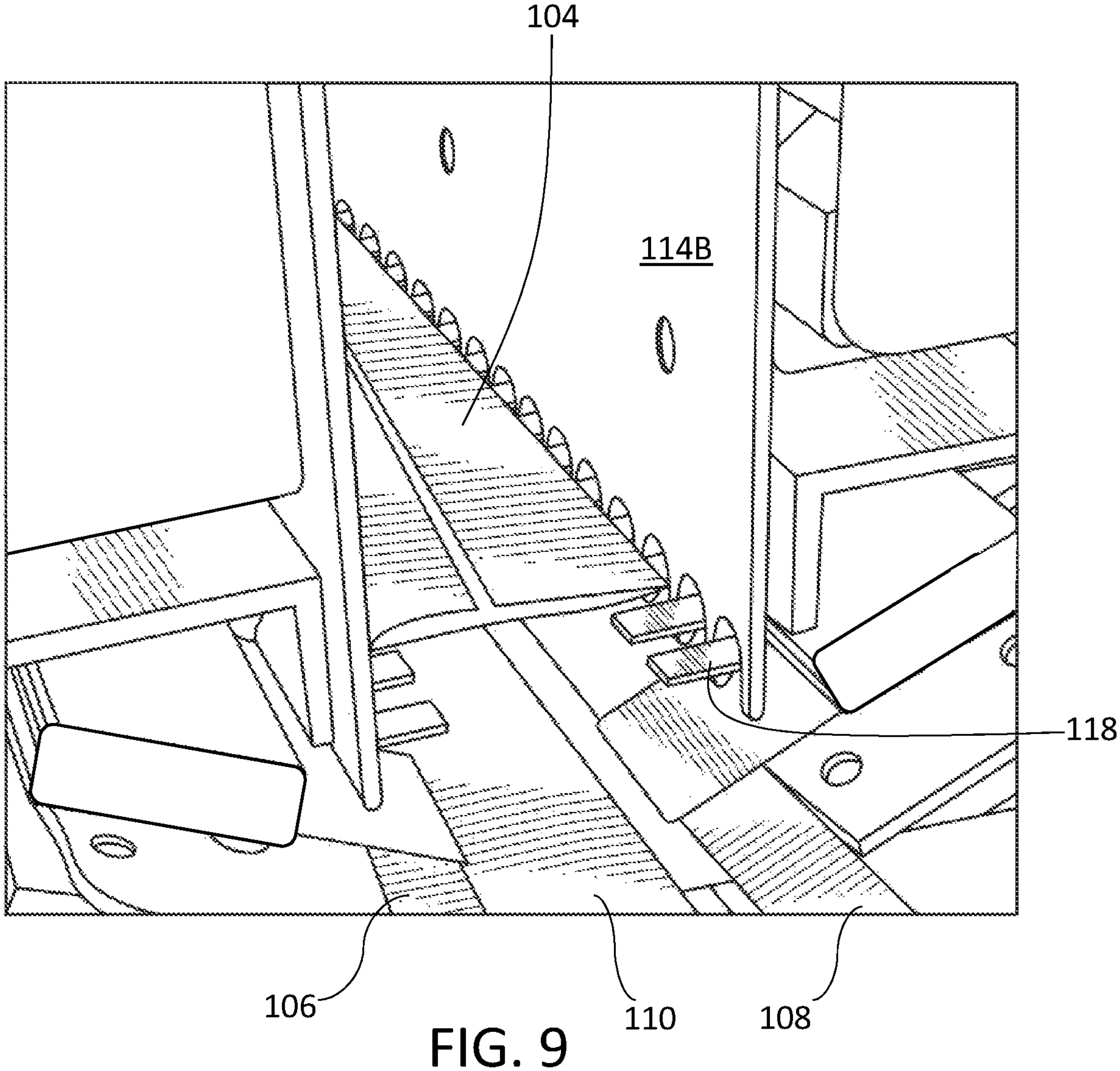
FIG. 9 illustrates a strip of material supported by a plurality of support fingers.
Figure 10:
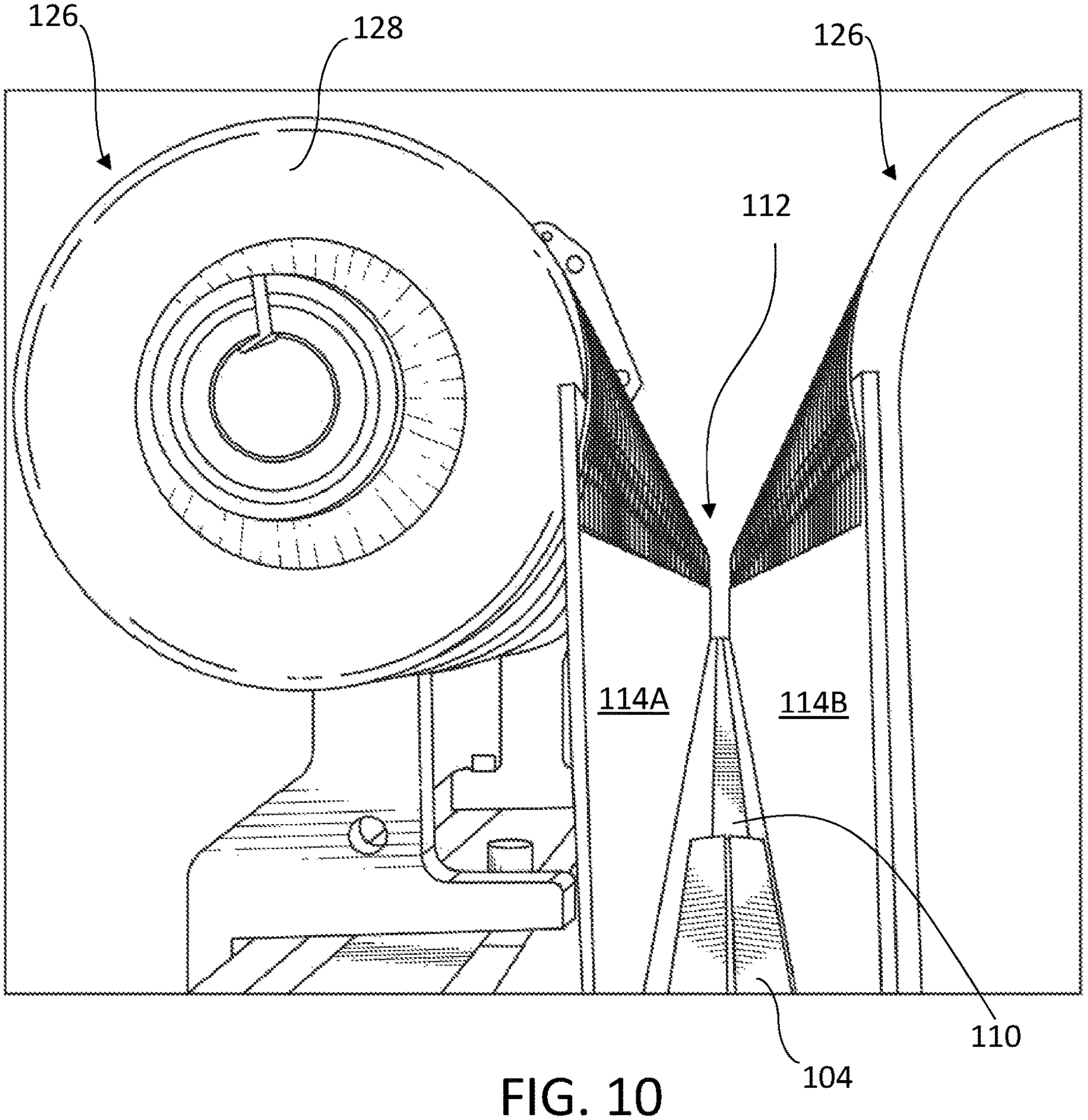
FIG. 10 illustrates a rotating mechanism coupled to the stacking chamber.
Figure 11:
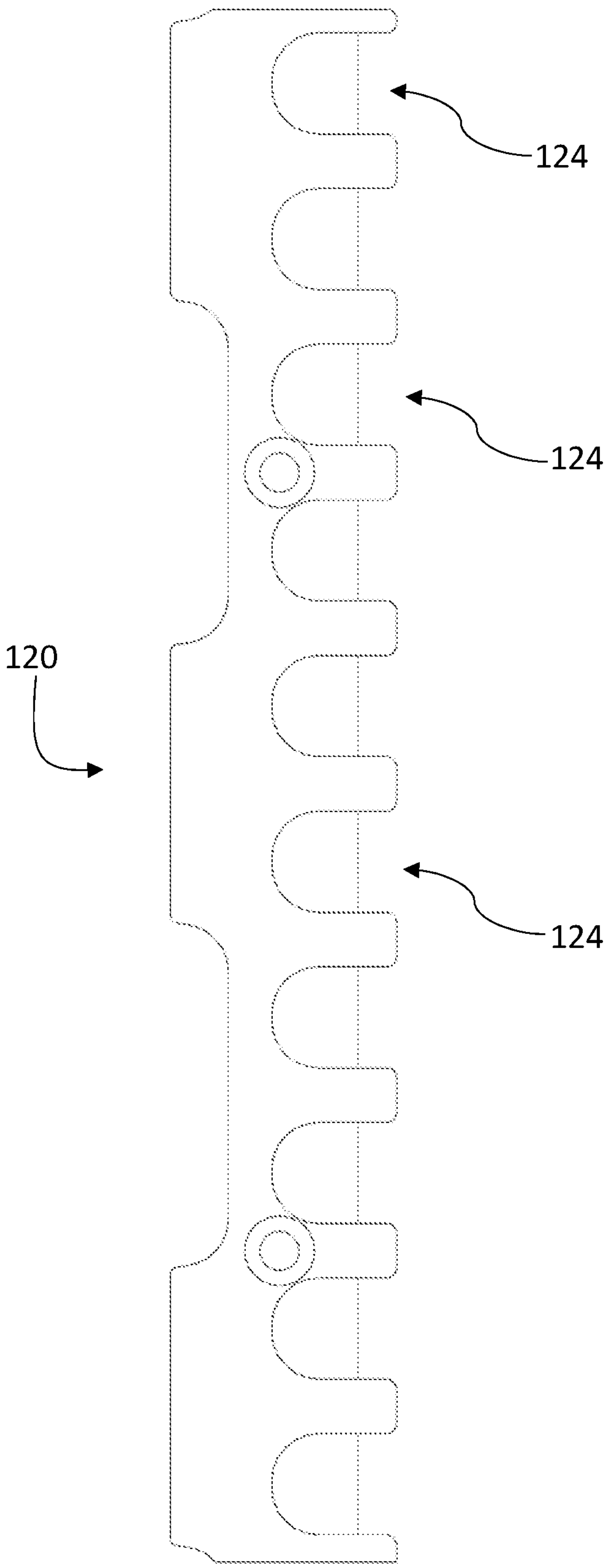
FIG. 11 illustrates a detailed component view of the chamber platform.

As shown in FIG. 8, once the strip material 104 has been adhered to the stack 103 above it, the support fingers 118 re-enter the stacking chamber 112 below the now-adhered strip material 104 to support the stack 103. To ensure the stack 103 does not fall, the support fingers 118 enter the stacking chamber 112 through wall apertures 122 and into platform apertures 124 (shown in FIG. 11), where the support fingers 118 are flush with the top of the chamber platform 120. As understood from FIG. 11, the chamber platform 120 may comprise one or more components. For example, a mirror image component may be coupled to the platform component illustrated in FIG. 11, such that the two components form the chamber platform 120. In other embodiments, a single component having component apertures 124 on each side may be used. In either scenario, the center conveyor belt 110 slides over the top of the chamber platform 120. As shown in FIGS. 8-9, the chamber platform 120 and center conveyor 110 then lower, leaving the support fingers 118 to hold the stack 103 of strip material 104. Because the support fingers 118 were nested within the component apertures 124 of chamber platform 120, the stack 103 does not significantly move when the chamber platform 120 is lowered. It will be appreciated that the strip material 104 in FIG. 9 has been displaced to better show the support fingers 118 supporting the strip material 104.

The support fingers 118 may also be used to measure the compression force of the resulting stack 103 of strip material 104 forming the integral blind 102. In other words, an amount of downward pressure/weight (also referred to as back-pressure) must be applied to the stack 103 to counteract the upward force of the chamber platform 120 so that the strip material 104 properly adheres one-to-another. As discussed in the background section, various methods have been employed in an attempt to solve the need for back-pressure. However, these methods have failed to adequately solve the problem and generally require frequent manual adjustments. To overcome this problem, the support fingers 118 may be used to gauge the compression force of the stack 103. In order to adjust the amount of compression needed, a rotating mechanism 126 may be used (best seen in FIGS. 1 & 10). For example, when the stack 103 is smaller, more force is needed to ensure proper compression than when the stack 103 is larger. Therefore, the rotating mechanism 126 actuates in reaction to the compression force measured by the support fingers 118. A microcontroller, or other suitable processor, may be used to measure the compression force and likewise control the motor of the rotating mechanism. A user may define the desired compression force based upon the material and desired outcome. The rotating mechanism 126 may comprise rollers 128, wheels, belts, or any other means of applying dynamic pressure to the stack. As the stack 103 grows in height, is exits the stacking chamber 112, as shown in FIG. 1. In one embodiment, the rotating mechanism 126 may not engage the stack 103 until the stack 103 reaches a certain height. For example, as shown in FIG. 1 the rotating mechanism 126 may be at a distance (e.g., the height of the walls 114A, 114B) from the center conveyor 110 where adhesion of the strip material 104 occurs. In this scenario, waste material, weights, or other items may be used to provide the initial stack 103 with sufficient back-pressure until the stack 103 reaches and engages the rotating mechanism 126. However, in other embodiments, the rotating mechanism 126 may be placed nearer to the adhesion point (where the center conveyor 110 enters the stacking chamber 112) so that additional weights/material are not needed in the beginning stages of blind manufacturing. In either embodiment, the dynamic adjustment for back-pressure (i.e., the support fingers 118 measuring the compression force and the rotating mechanism 126 rotating in reaction thereto) overcomes the problems in the art.

In one embodiment, as shown in FIGS. 1-10, a method for manufacturing an expandable integral blind 102 formed by adhering a plurality of cells formed from strip material 104 comprises supplying a plurality of strip material 104 (also referred to as strips of material) in succession to a stacker assembly 100, the strips of material 104 conveyed into a stacking chamber 112 using a first outer conveyor belt 106 and a second outer conveyor belt 108, each outer conveyor belt 106, 108 configured to engage a top (and in one embodiment, as shown, folded) surface of the strip of material 104 being conveyed, and a center conveyor belt 110 positioned between the first and second outer conveyor belts 106, 108, the center conveyor belt 110 configured to engage a bottom surface of the strip of material 104; securing the conveyed strip of material 104 in the stacking chamber 112 using a plurality of clamping tabs 116; retracting the first and second outer conveyor belts 106, 108 from contact with the conveyed strip of material 104; raising the chamber platform 120, the center conveyor belt 110, and the conveyed strip of material 104 while simultaneously withdrawing the clamping tabs 116 so that the conveyed strip of material 104 contacts and adheres to a previously conveyed strip of material 104, forming a stack 103; inserting a plurality of support fingers 118 into one or more platform apertures 124, lowering the chamber platform 120 and center conveyor belt 110, and supporting the stack 103 on the plurality of support fingers 118; and, positioning the outer conveyor belts 106, 108 and center conveyor belt 110 to engage a successive strip of material 104. The compression force of the stack 103 is measured using the support fingers 118. Based upon the data received from the support fingers 118, actuating a rotating mechanism 126 to create user-defined back-pressure. The rotating mechanism adjusts dynamically to account for the compression force of the stack 103 as it is formed.

Figure 12:
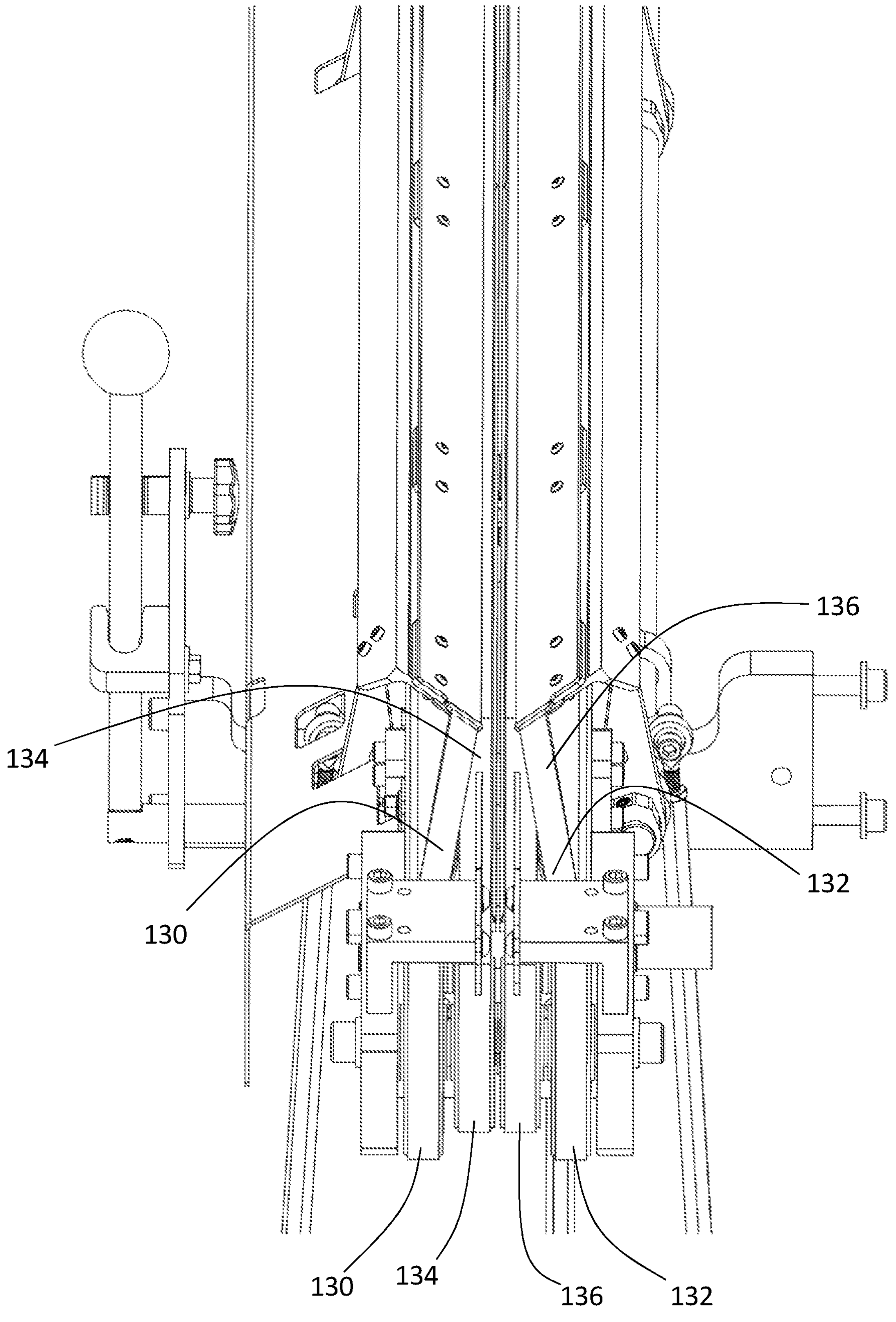
FIG. 12 illustrates a supply conveyor assembly for supplying strip material to the stacker assembly.

As mentioned in the background, several methods exist for transporting one or more strips of material into a stacking apparatus. The strips are often folded and need to remain so when entering the stacking apparatus. Despite the prior art's attempts, the folded strips may become unfolded during transport to the stacking apparatus, or complex systems must be deployed to keep the strips folded. As such, the art lacks an efficient, yet inexpensive means for transporting the strips to the stacking apparatus. Accordingly, a method for transporting strip material 104 to the stacker assembly 100 comprises, as shown in FIG. 12, two upper supply conveyor belts 130, 132, wherein each upper supply conveyor belt 130, 132 is configured to engage an outer edge of the top surface of the strip of material 104. In such a manner, the folds of the strip material 104 are pinched between a bottom surface (not visible in this view) and the two upper supply conveyors 130, 132. The bottom surface may be a flat surface of any material conducive to the slidability of the strip material 104 thereon (e.g., aluminum, plastic, etc.). The upper supply conveyor belts 130, 132 are positioned on the outer edges so as to avoid contact with any adhesive that may already be on the strip material 104. Because the folds are pinched, they remain folded during transport to the stacker assembly 100. Further, in one embodiment, and as shown in FIG. 12, at least one lower supply conveyor belt 134, 136 may also be used, reducing or eliminating any friction of the strip material 104 on a lower surface, which allows for quick and seamless transport of the strip material 104 to the stacker assembly 100. By interposing the strip material 104 between upper supply conveyor belts 130, 132 and lower supply conveyor belts 134, 136, the strip material 104 remains folded and is quickly transported to the stacker assembly 100. Because the stacker assembly 100 likewise interposes the strip material 104 between a plurality of conveyor belts (outer belts 106, 108 and center belt 110), the strip material 104 is consistently folded. In other words, the strip material 104 is conveyed from the two upper supply conveyor belts 130, 132 and is received by the outer conveyor belts 106, 108 of the stacker assembly 100. This eliminates errors in the stacking process, ensuring a fast and efficient manufacturing process.

The strip material 104 may come into the stacker assembly 100 from a single feed such that all strips of material 104 of the stack 103 are similar. In other applications, the strip material 104 may enter the stacker assembly 100 from a plurality of feeds in order to stack dissimilar materials. For example, strips of different shapes, folds, or adhesive locations may be stacked to produce different stack configurations. Alternating materials and/or colors may also be stacked to produce different visual effects. Dissimilar strip feeds may enter into one side of the stacker assembly 100, and/or the stacker assembly 100 may be configured to accept strip feeds from both sides by reversing the direction of conveyors (e.g., outer conveyors 106, 108 and center conveyor 110) in the stacker assembly 100 while alternating feeds of strip.

In one embodiment, a stacker assembly 100 for manufacturing an expandable integral blind, formed by adhering a plurality of cells formed from strip material, comprises opposing walls 114A, 114B forming a stacking chamber 112; and a rotating mechanism 126 coupled to the stacking chamber 112 for engaging the expandable integral blind 102; wherein, the rotatable mechanism 126 actuates in response to the compression force of the expandable integral blind 102.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A stacker assembly for manufacturing an expandable integral blind formed by adhering a plurality of cells formed from strip material, the stacker assembly comprising:

a first outer conveyor belt and a second outer conveyor belt, each outer conveyor belt configured to engage a top surface of a strip of material being conveyed; a center conveyor belt positioned between the first and second outer conveyor belts, the center conveyor belt configured to engage a bottom surface of the strip of material;

the outer conveyor belts and center belt configured to convey the strip of material into a stacking chamber, the stacking chamber formed by two opposing walls; a plurality of clamping tabs below each wall configured to clamp the top edges of the strip of material, the clamping tabs positioned beneath the first and second outer conveyor belts; and a plurality of support fingers configured to support a stack formed from the plurality of strips of material.

2. The stacker assembly of claim 1, wherein, in a first position, the first and second outer conveyor belts conceal the clamping tabs and are positioned on the top portion of the strip of material being conveyed and, in a second position, the first and second outer conveyor belts are retracted to reveal the clamping tabs and are not in contact with the strip of material.

3. The stacker assembly of claim 1, wherein the opposing walls comprise a plurality of apertures for receiving the clamping tabs and support fingers.

4. The stacker assembly of claim 1, wherein the support fingers measure the compression force of the stack.

5. The stacker assembly of claim 4, further comprising a rotating mechanism to create back-pressure on the stack.

6. The stacker assembly of claim 5, wherein the rotating mechanism comprises at least one roller.

7. The stacker assembly of claim 5, wherein the rotating mechanism actuates in response to data received from the support fingers to provide back-pressure which increases the compression force of the stack.

8. A method of using a stacker assembly for manufacturing an expandable integral blind formed by adhering a plurality of cells formed from strip material, the method comprising:

supplying a plurality of strips of material in succession to a stacker assembly, the strips of material conveyed into a stacking chamber using a first outer conveyor belt and a second outer conveyor belt, each outer conveyor belt configured to engage a top surface of the strip of material being conveyed, and a center conveyor belt positioned between the first and second outer conveyor belts, the center conveyor belt configured to engage a bottom surface of the strip of material;

securing the conveyed strip of material in the stacking chamber using a plurality of clamping tabs;

retracting the first and second outer conveyor belts from contact with the conveyed strip of material;

raising the center conveyor belt and conveyed strip of material while simultaneously withdrawing the clamping tabs so that the conveyed strip of material contacts and adheres to a previously conveyed strip of material, forming a stack;

lowering the center conveyor belt and supporting the stack on a plurality of support fingers; and positioning the outer conveyor belts and center conveyor belt to engage a successive strip of material.

9. The method of claim 8, further comprising measuring the compression force of the stack via the support fingers.

10. The method of claim 9, further comprising actuating a rotating mechanism in contact with the stack based-upon the compression force data received from the support fingers.

11. The method of claim 8, wherein the plurality of strips are supplied to the stacker assembly using at least two upper supply conveyor belts, wherein each belt is configured to engage an outer edge of the top surface of the strip of material.

12. The method of claim 11, further comprising two lower supply conveyor belts, wherein each belt is configured to engage an outer edge of the bottom surface of a strip of material.

13. A stacker assembly for manufacturing an expandable integral blind formed by adhering a plurality of cells formed from strip material, the stacker assembly comprising:

opposing walls forming a stacking chamber;

a rotating mechanism coupled to the stacking chamber for engaging the expandable integral blind; and a plurality of clamping tabs for securing the strip material when it enters the stacking chamber;

wherein, the rotatable mechanism actuates in response to the compression force of the expandable integral blind.

14. The stacker assembly of claim 13, wherein the rotating mechanism comprises at least one roller.

15. The stacker assembly of claim 13, further comprising a plurality of support fingers for supporting the expandable integral blind within the stacking chamber.

16. The stacker assembly of claim 15, wherein the support fingers measure the compression force of the expandable integral blind.

* * * * *